(12) United States Patent
Schray et al.

(10) Patent No.: US 6,505,603 B1
(45) Date of Patent: Jan. 14, 2003

(54) FUEL INJECTION METHOD FOR AN INTERNAL COMBUSTION ENGINE

(75) Inventors: Bernhard Schray, Oberriexingen (DE); Thomas Edelmann, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/674,297

(22) PCT Filed: Sep. 28, 1999

(86) PCT No.: PCT/DE99/03108

§ 371 (c)(1),
(2), (4) Date: Oct. 31, 2000

(87) PCT Pub. No.: WO00/52317

PCT Pub. Date: Sep. 8, 2000

(30) Foreign Application Priority Data

Mar. 1, 1999 (DE) .......................................... 199 08 729

(51) Int. Cl.$^7$ ............................................... F02B 17/00
(52) U.S. Cl. ........................ 123/299; 123/305; 701/104
(58) Field of Search ................................ 123/294, 299, 123/305; 701/104

(56) References Cited

U.S. PATENT DOCUMENTS

| 4,704,999 | A | | 11/1987 | Hashikawa et al. |
| 4,821,194 | A | * | 4/1989 | Kawamura ............. 123/406.16 |
| 5,163,405 | A | | 11/1992 | Ahern et al. |
| 5,713,328 | A | | 2/1998 | Anderson et al. |
| 6,041,755 | A | * | 3/2000 | Mashiki ................. 123/406.29 |

FOREIGN PATENT DOCUMENTS

| EP | 0 539 921 | 5/1993 |
| EP | 0 849 459 | 6/1998 |

* cited by examiner

Primary Examiner—John Kwon
(74) Attorney, Agent, or Firm—Walter Ottesen

(57) ABSTRACT

A fuel injecting method and a corresponding arrangement for an internal combustion (10), especially of a motor vehicle, wherein a first injection takes place during an induction stroke. Proceeding from operating characteristic variables of the engine (10), a tendency-to-knock signal is determined which characterizes the tendency to knock of the engine (10). At least one second injection takes place when the tendency-to-knock signal exceeds a threshold value. (FIG. 1)

14 Claims, 2 Drawing Sheets

FUEL INJECTION METHOD FOR AN INTERNAL COMBUSTION ENGINE

FIELD OF THE INVENTION

The invention relates to a fuel injection method for an internal combustion engine, especially of a motor vehicle.

BACKGROUND OF THE INVENTION

In internal combustion engines, a high compression ratio is sought for reducing the consumption and for increasing the torque. However, with increasing compression ratio, the problem of an uncontrolled occurring self-ignition of the air/fuel mixture increases. A knocking combustion occurs as a consequence. One distinguishes between two types of knocking, the so-called acceleration knocking at low engine speed and high load (can be heard as a ringing) as well as the high engine speed knocking (which cannot be heard) at high engine speeds and high load. The high engine speed knocking is especially critical for the engine.

The knocking combustion generates pressure oscillations which superpose on the normal pressure course.

Continuous knocking causes severe damage to the engine (destroyed cylinder head seals, bearing damage, holes in the piston) and damage to the spark plugs.

The knocking limit is dependent, inter alia, on the type of engine and on the fuel. The knocking resistance of fuels for fuel-injection engines is characterized by the octane number (ON). The higher this number is, the more resistant to knocking is the fuel.

The oscillations emanating from the combustion chamber are detected by the knock sensor. The output signal of the knock sensor is supplied to a control apparatus of the engine. The control apparatus evaluates the knock signal and initiates suitable countermeasures when a knocking combustion is detected. For this purpose, the ignition time point is, as a rule, shifted so far in the direction "retard" until there is again a drop below the knock limit.

SUMMARY OF THE INVENTION

The present invention has as its object to improve a method of the above type so that an operation of an internal combustion engine is possible at its operating limits without suffering a loss in torque because of knocking combustion.

The method of the invention is for injecting fuel for an internal combustion engine including an engine of a motor vehicle. The method includes the steps of: making a first injection in an induction stroke; determining a tendency-to-knock signal characterizing the danger of an occurring knocking; and, making at least one second injection when the tendency-to-knock signal exceeds a threshold value.

The especially great advantage of the present invention is that an increase of the maximum outputted torque of the engine is reached. Furthermore, the knocking limit is raised, that is, the engine becomes more resistant to knocking.

A further advantage is that, with a knock control with the aid of double injections, only a slight torque reduction results compared to the knock control with the aid of a shift of the ignition angle in the direction of retard. A knock control via double injection and ignition angle intervention or a combined intervention of both is possible in order to operate the engine at the optimal operating point.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
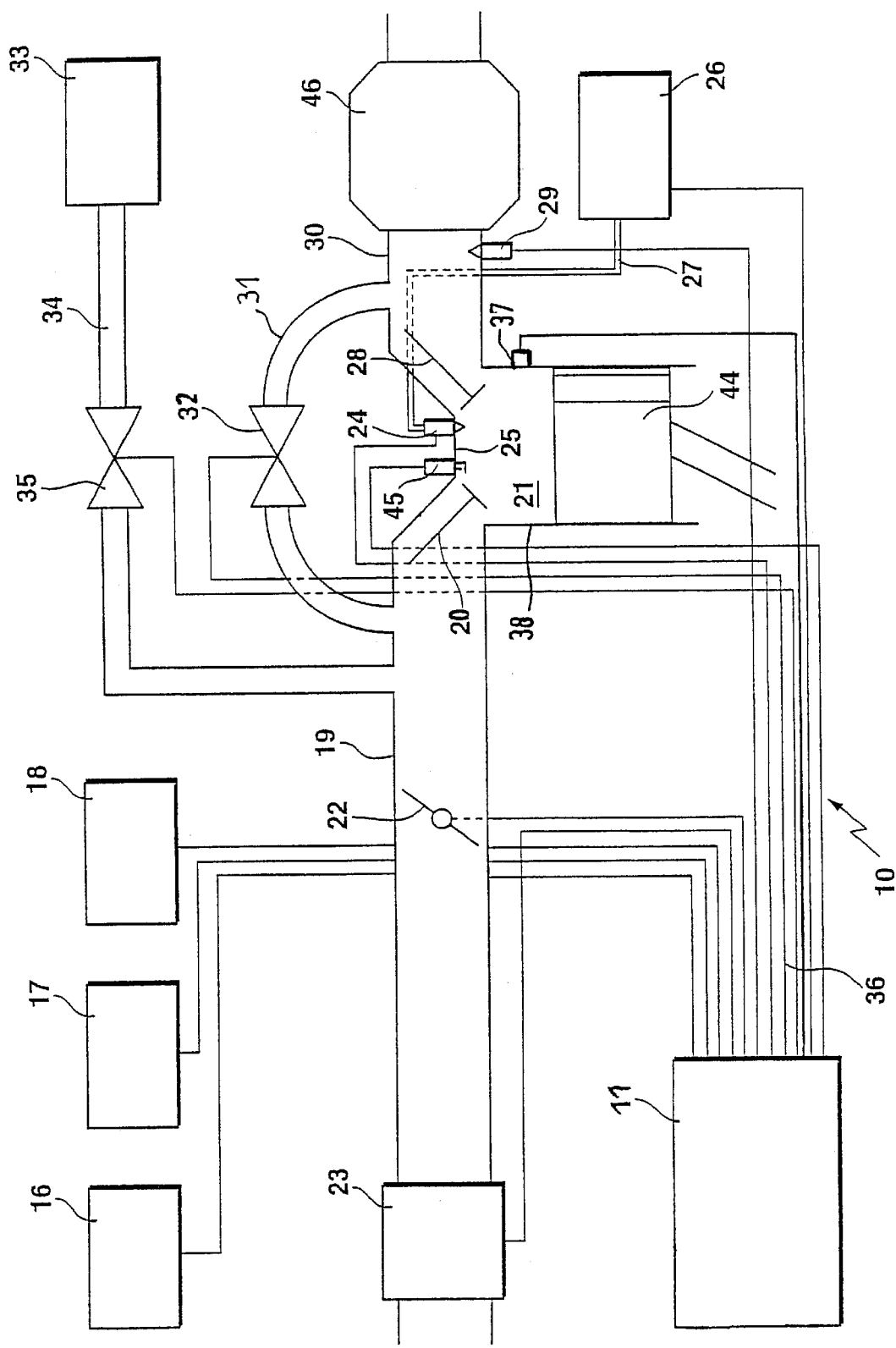
FIG. 1 shows schematically an illustration of an internal combustion engine having a control apparatus; and, FIG. 2 shows an operating characteristic field of an internal combustion engine.

As shown in FIG. 1, in an internal combustion engine having direct injection 10, fresh air is supplied to cylinder 38 or combustion chamber 21 in cylinder 38 via an intake manifold 19 and an inlet valve 20. The quantity of fresh air, which is supplied to the combustion chamber 21, can be controlled via a throttle flap 22. An air quantity sensor 23 detects the fresh air flowing into the engine 10.

An injection valve 24 and a spark plug 45 are mounted in the cylinder head 25. The fuel is brought to a working pressure by means of a high-pressure pump 26 and is injected into the combustion chamber 21 via a fuel line 27 and injection valves 24. The injected fuel is ignited with the aid of the spark plug 45. A piston 44 is driven by the expansion of the ignited fuel. Furthermore, the combustion chamber 21 includes an outlet valve 28 for discharging the exhaust gases occurring in a combustion.

A knock sensor 37 and/or an ion flow sensor 37 are mounted on the cylinder 38. The oscillations which occur in the combustion are detected with the aid of the knock sensor 37. The ions occurring during a combustion are detected with the aid of the ion flow sensor 37. The combustion performance of the engine can be detected and especially a conclusion as to a knocking combustion can be drawn by evaluating the signal of the knock sensor and/or of the ion flow sensor 37.

A lambda probe 29 is mounted in an exhaust-gas pipe 30. The oxygen component in the exhaust gas can be measured with the aid of the lambda probe 29 in the exhaust-gas pipe 30 whereby the air/fuel ratio can be determined in the mixture. A catalytic converter 46 is also mounted in the exhaust-gas pipe 30. The catalytic converter 46 has the task of converting toxic exhaust-gas components such as CO, HC and NO into $CO_2$, $H_2O$ and $N_2$.

An EGR line 31 connects the exhaust-gas pipe 30 to the intake manifold 19. A portion of the exhaust gas is conducted from the output pipe 30 into the intake manifold 19 because of the higher pressure in the exhaust-gas pipe 30. The exhaust-gas flow in the EGR line 31 can be controlled with the aid of an EGR valve 32.

A tank-venting line 34 leads from a fuel tank or active charcoal filter 33 to the intake manifold 19 whereby additional fuel can reach the intake manifold 19 and therefore also the combustion chamber 21. The fuel flow in the tank-venting line 34 can be controlled by means of a tank-venting valve 35.

The control of the entire engine 10 takes place by means of the control apparatus 11. Further, the control apparatus 11 can control a transmission 16, a braking system 17 and/or any other additional electromechanical systems 18. The various sensors and actuators are connected to the control apparatus 11 via signal and control lines 36.

The engine 10 can be operated in different operating modes which differ essentially by the injection time point, the ignition time point, and the cylinder charge. A switchover between the operating modes of the engine can be made with the aid of the control apparatus 11. The essential operating modes of the engine are the homogeneous operation HOM and the stratified operation SCH.

In homogeneous operation, the fuel is injected into the combustion chamber 21 by the injection valve 24 during an induction phase caused by the piston movement. At the same time, air is inducted via the throttle flap 22. The inducted air swirls the fuel which distributes in the chamber almost uniformly or homogeneously. The air/fuel mixture is then compressed in order to be ignited by a spark plug 45. The ignited air/fuel mixture expands and drives the piston 44. The occurring torque is, in homogeneous operation, essentially dependent upon the position of the throttle flap 22 and is thereby essentially proportional to the fresh gas charge RL in the cylinders. The air/fuel mixture is adjusted as close as possible to lambda=1 or lambda<1 in order to obtain a high torque and a low development of toxic substances with the combustion. The homogeneous operation is preferably adjusted in the full load range of the engine but can also be adjusted over the entire operating range of the engine.

In the stratified operation SCH, the throttle flap 22 is opened wide whereby the engine can be operated almost unthrottled. The fuel is injected during the compression phase in such a manner that, at the ignition time point, an ignitable air/fuel cloud is in the direct vicinity of the spark plug. Then, the air/fuel cloud is ignited by the spark plug 45 and the piston 44 is driven by the following expansion of the ignited air/fuel cloud. The occurring torque is, in stratified operation, dependent essentially on the injected fuel mass. The stratified operation is adjusted in the part-load range of the engine.

Figure 2:
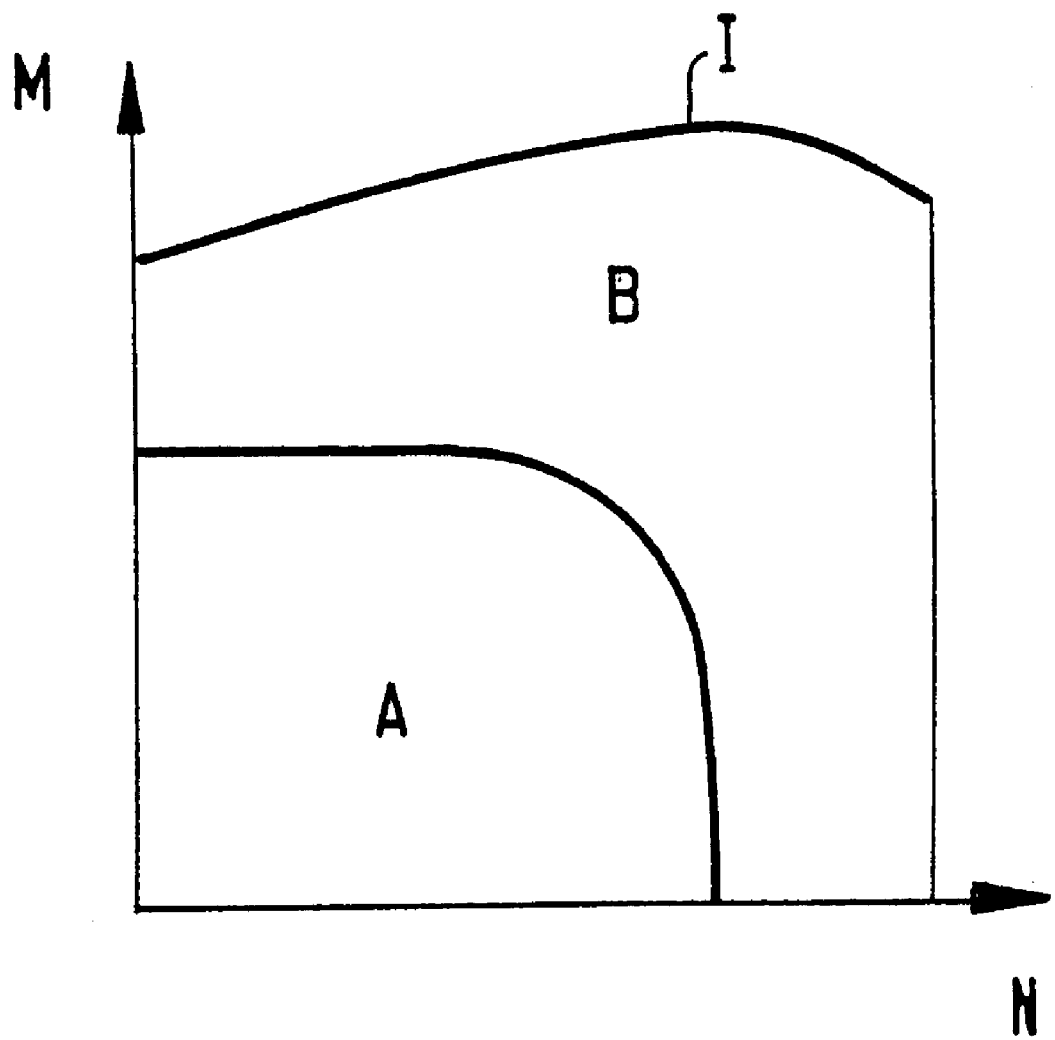

In FIG. 2, the operating characteristic field of an engine having direct injection is shown.

In FIG. 2, M identifies the outputted torque and N identifies the rpm of the particular engine. A identifies the operating region in which the stratified operation is adjusted and B identifies the operating region wherein the homogeneous operation of the engine is adjusted. The characteristic line I identifies the operating limit of the engine which is determined, inter alia, also by the knock limit of the engine 10.

In the control apparatus 11, the rpm N is continuously detected. The torque M is determined during homogeneous operation on the basis of the cylinder charge RL and, in stratified operation, on the basis of the injected fuel mass RK. A tendency-to-knock signal is determined on the basis of the detected cylinder charge RL and the rpm N or on the basis of the injected fuel mass RK and the rpm N. The tendency-to-knock signal is compared to a threshold value and double injections are initiated when this threshold value is exceeded.

In this context, double injection means that the first injection takes place in the induction stroke and the second injection takes place in the compression stroke. The second injection causes the air/fuel mixture present in the combustion chamber 21 because of the first injection to be cooled whereby the danger of an uncontrolled ignition of the air/fuel mixture is reduced.

Also, in knock endangered operating regions and before reaching the engine operating limits, the knocking limit of the engine 10 is reduced and/or the knocking behavior is improved by the double injections. An increase of the outputted maximum torque of up to 5% is obtained especially by carrying out targeted double injections in the region of the operating limits.

The proportion of the fuel mass to be injected in the first and in the second injection is determined in dependence upon the extent of the tendency-to-knock signal and/or from an engine parameter specific characteristic field stored in the control apparatus 11. The proportion of the first and second injections varies between 30 and 70% depending on the operating state of the engine 10 and in dependence upon the extent of the tendency-to-knock signal. The first injection takes place typically 300° ahead of TDC and the second injection takes place typically 80° ahead of TDC.

In this embodiment of the fuel injection method of the invention, the tendency-to-knock signal for each individual cylinder of the engine 10 is continuously detected and evaluated. In this way, it is possible to carry out double injections in individual cylinders when detecting the danger of knocking.

When detecting a "knocking" combustion, double injections are carried out in addition to the knock control by shifting the ignition angle in a direction of retard. In this way, the ignition angle control depth of the knock control is reduced which leads to an improved control result, a reduction of consumption and an increase of the torque.

What is claimed is:

1. A method of injecting fuel for an internal combustion engine including an engine of a motor vehicle, the method comprising the steps of:
   making a first injection in an induction stroke;
   determining a tendency-to-knock signal characterizing the danger of an occurring knocking; and,
   making at least one second injection when the tendency-to-knock signal exceeds a threshold value.

2. The method of claim 1, wherein the second injection takes place in a compression stroke.

3. The method of claim 1, comprising the further step of making said at least one second injection when the engine is in the region of the maximum torque or in further knock-endangered regions at an instantaneous torque with these regions being characterized in a characteristic field.

4. The method of claim 1, comprising the step of including at least one of the output signals of a knock sensor and an ion flow sensor in the tendency-to-knock signal.

5. The method of claim 1, comprising the further step of forming the tendency-to-knock signal starting from operating characteristic variables of said engine.

6. The method of claim 4 comprising the further step of forming the tendency-to-knock signal starting from at least one of the following: the cylinder charge, the injected fuel mass and the rpm.

7. The method of claim 1, comprising the further step of carrying out double injections in addition to a knock control by shifting the ignition angle in the direction of retard when detecting a knocking combustion.

8. The method of claim 1, comprising the further step of determining the proportion of the fuel quantity to be injected in the first and in the at least second injection in dependence upon at least one of the following: the extent of the tendency-to-knock signal and a parameter specific to the engine from a characteristic field.

9. The method of claim 8, wherein the distribution factor of the injected fuel in the first and in the at least second injection amounts to 30 to 70%.

10. The method of claim 1 wherein the first injection takes place 330° forward of top dead center and the second injection takes place 80° forward of top dead center.

11. The method of claim 1, wherein said method is applied in an internal combustion engine having direct injection.

12. The method of claim 1, wherein the at least second injection takes place specific to the cylinder or specific to the cylinder bank.

13. An electronic storage medium including a read-only-memory, for a control apparatus of an internal combustion engine including an engine of a motor vehicle, on which a program is stored which can be run on a control apparatus including a microprocessor, and which is suitable for carrying out a method comprising the steps of making a first injection in an induction stroke; determining a tendency-to-knock signal characterizing the danger of an occurring knocking; and, making at least one second injection when the tendency-to-knock signal exceeds a threshold value.

14. An arrangement for carrying out the method of injecting fuel for an internal combustion engine including an engine of a motor vehicle, the arrangement comprising:

means for forming a tendency-to-knock signal characterizing the danger of an occurring knocking; and, means for effecting at least a second injection when the tendency-to-knock signal exceeds a threshold value.

* * * * *